Figure 1:
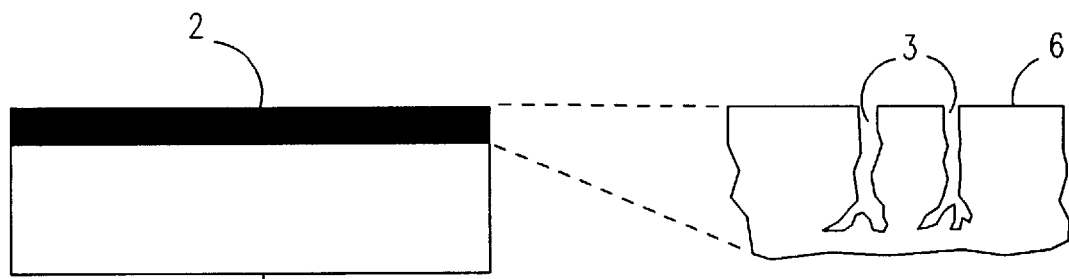

United States Patent

Bandara et al.

[11] Patent Number: 5,923,511
[45] Date of Patent: Jul. 13, 1999

[54] DIRECTLY CONTACTABLE DISK FOR VERTICAL MAGNETIC DATA STORAGE

[75] Inventors: Upali Bandara, Leimen; Arved Brunsch, Stuttgart; Gerhard Elsner, Sindelfingen, all of Germany

[73] Assignee: International Business Machines Corporation, Armonk, N.Y.

[21] Appl. No.: 08/793,013
[22] PCT Filed: May 26, 1995
[86] PCT No.: PCT/EP95/02023
  § 371 Date: Jan. 23, 1997
  § 102(e) Date: Jan. 23, 1997
[87] PCT Pub. No.: WO96/37885
  PCT Pub. Date: Nov. 28, 1996
[51] Int. Cl.⁶ .............. G11B 5/62; C25D 5/34; B32B 3/02
[52] U.S. Cl. .................. 360/135; 205/210; 428/65.3
[58] Field of Search .................. 360/97.01, 98.01, 360/133, 135; 428/64.2, 64.1, 65.3, 65.5, 116, 117, 306.6, 312.6, 315.5

[56] References Cited

U.S. PATENT DOCUMENTS

| | | | |
|---|---|---|---|
| 4,109,287 | 8/1978 | Kawai et al. | 360/131 |
| 4,598,017 | 7/1986 | Bayer et al. | 428/336 |
| 4,689,260 | 8/1987 | Briska et al. | 428/161 |
| 4,833,001 | 5/1989 | Kijima et al. | 428/141 |
| 5,047,274 | 9/1991 | Tsuya et al. | 428/65.6 |
| 5,108,812 | 4/1992 | Takahashi et al. | 428/141 |
| 5,465,184 | 11/1995 | Pickering et al. | 360/97.01 |
| 5,480,694 | 1/1996 | Daimon et al. | 428/64.1 |
| 5,480,695 | 1/1996 | Tenhover et al. | 428/65.5 |
| 5,487,931 | 1/1996 | Annacone et al. | 428/64.1 |
| 5,543,371 | 8/1996 | Katayama et al. | 501/97 |
| 5,569,427 | 10/1996 | Semenova et al. | 264/129 |
| 5,623,386 | 4/1997 | Sullivan | 360/135 |
| 5,626,943 | 5/1997 | Tenhover | 428/141 |
| 5,633,081 | 5/1997 | Clough et al. | 428/331 |

FOREIGN PATENT DOCUMENTS

| | | |
|---|---|---|
| 2309594 | 2/1973 | Germany. |
| 3328839 | 8/1983 | Germany. |
| 59-226101 | 12/1984 | Japan. |
| 63-217522 | 9/1988 | Japan. |
| 1-144208 | 6/1989 | Japan. |
| 2-217380 | 8/1990 | Japan. |
| 0567748 | 11/1993 | United Kingdom. |

OTHER PUBLICATIONS

"Microstructure and Formation Mechanism of Porous Silicon" by M. Beale et al Appl. Phys. Ltt. 46 Jan. 1, 1985.

"Porous Silicon: The Material and Its Applications to SOI Technologies" by G. Bomchil et al Microelectronic Engineering (1988).

IBM TDB Wol. 36 No. 02, Feb. 1993 "Silicon Disk For Small Hard Disk Drive".

*Primary Examiner*—Jefferson Evans
*Attorney, Agent, or Firm*—G. Marlin Knight

[57] ABSTRACT

A disk is described for vertical magnetic data storage, which can be directly contacted by a read/write head, consists of a substrate made of silicon, the surface of which forms a layer of porous silicon. The layer of porous silicon preferably contains pores which run essentially perpendicular to the surface of the substrate and are at least partially filled with a magnetic material. To manufacture the disk, a substrate made preferably of monocrystalline silicon, is chemically treated to form the pores which are at least partially filled with a magnetic material. The magnetic material may be removed from the surface between the pores. The silicon surface may then be treated to improve the wear characteristics. With such a disk, the read/write head can come in direct contact with the treated silicon substrate surface without abrasion or damage.

18 Claims, 1 Drawing Sheet

DIRECTLY CONTACTABLE DISK FOR VERTICAL MAGNETIC DATA STORAGE

The invention relates to a disk for vertical magnetic data storage, in which the read/write process takes place perpendicular to the surface of the disk, and which can be contacted directly by a read/write head, as well as a process for the manufacture of such a disk.

The technique of vertical magnetic data recording allows for higher bit densities than horizontal recording. For vertical recording, a thin magnetic layer is required, in which the easy axis is located perpendicular to the surface of the disk. Such a magnetic layer can be created with more or less satisfactory results by separation processes. Problems arise, however, with the selection of the material, since no suitable material is available which simultaneously possesses the optimum magnetic properties and the optimum abrasion properties. Vertical magnetic data recording, in which the read/write head comes into direct contact with the storage disk, is therefore excluded, or requires an additional protective layer, which in turn decreases the bit density.

The improvement of the magnetic properties, namely an increase in the anisotropy, can be achieved if the magnetizable material is located in pores in the carrier substrate. A suitable anisotropic magnetic recording material for the vertical storage of information, with magnetic particles arranged perpendicular to the carrier substrate is known from the German public disclosure document 23 09 594. With this known arrangement, the magnetic storage material is applied in aluminium oxide micropores, which are located perpendicular to the recording carrier medium. The recording carrier medium, in general the substrate, consists primarily of aluminium or an aluminium alloy, the surface of which is provided with these pores by anodic oxidation. These pores are then filled with magnetic material in an electrochemical process. The pores have low thickness in relation to their length, with the result that the magnetic material possesses a shape anisotropy which is directed perpendicular to the plane of the recording carrier medium, and therefore contains a vertical magnetisation direction. For preference, the magnetic substance is packed in every pore only as far as just below the pore aperture. If the magnetic substance fills out the pore aperture completely, the abrasion at the points of the surface of the magnetic recording material which come in contact frequently with the magnetic head, forms a powder out of the oxide film and the magnetic substance, which from time to time may impair the recording.

With this known magnetic recording carrier substance, the substrate, i.e. the core of the recording carrier, which also determines its mechanical strength, consists of aluminium or an aluminium alloy. Enclosures in the substrate material, which do not consist of aluminum, i.e. in general external phase enclosures, exert a magnetic interference of such a nature that interference may occur during the recording. The carrier material or the substrate determines the mechanical strengths in particular when solid magnetic disks are under consideration. If aluminium is used, the carrier may in this case consist solely of technical aluminium or a technical aluminium alloy, and not of pure aluminium, since pure aluminium is very soft. With the given degree of purity of technical alloys, a coarse limit surface is created between the metal and the aluminium oxide during the anodizing process. This leads to a situation in which the magnetic particles, arranged perpendicular and partially rod-shaped, are of different lengths and therefore have different magnetic properties. In particular, the pores feature fluctuations in diameter. This in turn incurs disadvantageous consequences for the recording reproduction process.

An improved surface is obtained with the storage medium described in the German public disclosure document 33 28 839. In this case, a soft magnetic layer is first applied on a substrate, and a carrier layer of non-magnetic material laid on this. In the carrier layer, made of plastic, pores are created by heavy ions, which are filled with magnetizable material. A disadvantage of this storage medium is that it is not suited for direct contact with a read/write head, since the plastics are not sufficiently resistant to abrasion, and the heavy ion structuring is also relatively elaborate.

The aim of the invention is the preparation of a directly contactable disk for vertical magnetic data storage, in which context the disk features not only a high storage density but also good abrasion characteristics and increased reliability.

This task is resolved according to the invention as described below. The directly contactable disk according to the invention, for vertical magnetic data storage, consists of a substrate made of monocrystalline silicon, the surface of which forms a layer of porous silicon. The layer of porous silicon contains pores which run essentially perpendicular to the surface of the substrate, and are filled with a magnetizable material.

The manufacture of such a disk requires the following stages: The preparation of a substrate made of monocrystalline silicon, the manufacture of a layer of porous silicon in the surface of the substrate, with pores running essentially perpendicular to the surface of the substrate, and filling of the pores with a magnetizable material.

The disk according to the invention has the advantage that, as a disk for vertical magnetic data storage, it allows for a high storage density, and can come in contact directly with a read/write head, since the dimensions of a read/write head are large in relation to the pores in the surface of the disk, and, when the read/write head runs across the surface of the disk, only the silicon material will be touched, which is not sensitive to abrasion; as a result, no friction or abrasion occurs which might interfere with the read/write process.

Further advantageous embodiments of the invention are described in detail hereinafter, making reference to the drawings.

Figure 2:
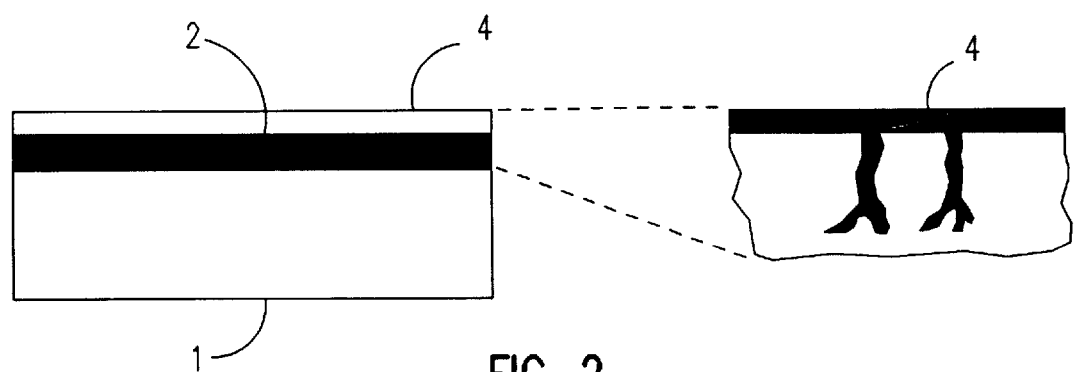
Figure 3:
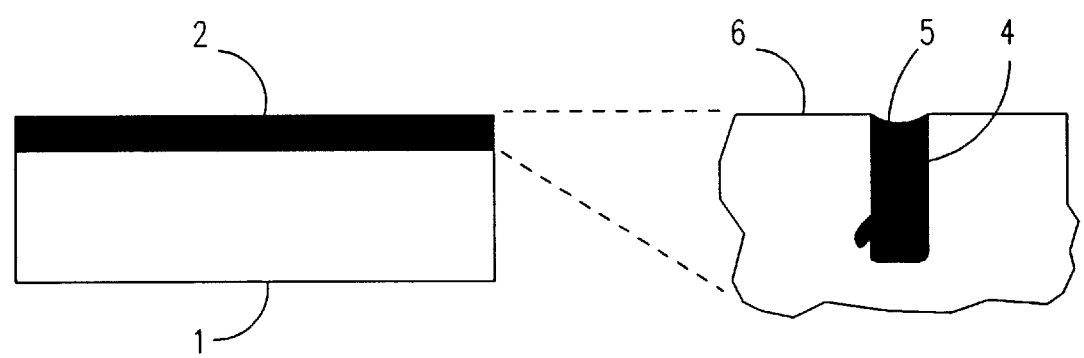

FIGS. 1, 2, and 3 show in schematic form, as a cross-section through the disk, the most important part stages of the manufacturing process according to the invention. For better visualisation of the pores, the corresponding part sections of the substrate surface are also shown, clearly enlarged and not to scale.

In FIG. 1, the prepared substrate 1, made of monocrystalline silicon, contains in its surface area a layer of porous silicon 2. For the monocrystalline silicon substrate, polished monocrystalline silicon chips can be used, as are conventional for chip manufacture. These silicon chips have a high surface quality, are extremely smooth, feature no unevenness, and in addition feature good mechanical strength, with the result that they meet the requirement without additives, and therefore no surface precipitation whatever need be feared. They are therefore extremely well-suited for use as carrier substrates. This surface quality is even retained when the likewise monocrystalline surface area of the silicon substrate is converted, up to a defined depth, into porous silicon. The manufacture of porous silicon and its properties are well known from chip development, since this process makes it possible for advantageous switching circuits to be manufactured in the silicon-on-insulator (SOI) technique. In, for example, Bromchil et al., Microelectr. Engineer 8, 1988, 293–310, or in Appl. Phys. Lett. 46, 1985, 86–88, anodic manufacturing processes are described for porous silicon, as well as various different application possibilities.

The layer shown in FIG. 1, of porous silicon 2, has been manufactured by anodic oxidation of the silicon substrate, for example in concentrated hydrofluoric acid. In this situation, for preference, pores 3 are created, essentially perpendicular to the surface 6 of the substrate 1, but these may feature arterialization, as can be seen in the enlarged part sections of the substrate surface in FIG. 1. The overall porosity, the pore depth, and the pore radius can be adjusted within broad limits depending on the implementation of the process. Typical pore radii are between approx. 1 to 10 nm. For example, with a pore radius of 4 nm and a porosity of 50%, on a bit of 0.1 $\mu$m2 there would be about 1000 pores, which would correspond to an area bit density of 1 Gbit/cm2. It must however be born in mind that, with a porosity of >35%, there is a threat that the quality of the monocrystalline properties might start to deteriorate.

The pores 3 are filled with a magnetizable material 4, as shown in FIG. 2. The pores 3 are filled by means of suitable coating processes such as sputtering or separation from the vapour phase (the CVD process), in which the pores are filled at least in part with the magnetizable material 4. A suitable magnetizable material is, for example, CoCr, CoCrTa, or CoPtCr.

During the more or less complete filling of the pores with the magnetizable material, the entire surface 6 of the carrier substrate 1 is coated with the magnetizable material 4. In a subsequent stage, the layer of magnetizable material 4 is removed from the substrate surface 6 in the areas in which no pores 3 are located. Particularly well-suited for this is a micropolishing process known from chip technology, which is used in that context for planarization. The effect of this polishing process is that the surface 5 of the magnetizable material 4 remaining in the pores 3 can be easily set back in relation to the substrate surface 6, as can be seen in FIG. 3. If this polishing process is used, then, by contrast with the state-of-the-art example described in the German public disclosure document 23 09 594, the pores can be filled with no problem as far as the substrate surface with the magnetizable material.

This renders superfluous the need to monitor the filling level when filling the pores.

The effect of the resoftening of the material in relation to the surface occurs when polishing composite materials, which are made up of several materials, and is particularly advantageous for the disks described here for vertical magnetic data storage, in which the read/write process takes place perpendicular to the disk surface. As a result of the surface of the filled pores being slightly set back, the read/write head, which comes in direct contact with the disk, will not stick to the disk when at rest, in the area of the pore surface, and, when sliding or moving across the disk, no interfering abrasion of the magnetizable material will occur. This increases the overall reliability of the individual storage disk, and of the storage disk system.

With the conclusion of the micropolishing process described above, the disk is completed.

To improve the surface quality still further, it is possible for a surface enhancement layer to be applied onto the substrate surface 6 in addition, before the pores 3 are filled. This can be done by converting the silicon substrate surface into a silicon oxide layer, or by the application of a silicon nitride layer. For preference, this is done by means of a scattering of N2 or O2 ions perpendicular to the substrate surface, and possible subsequent thermal treatment to make good any surface defects.

With the use of the disk described here, for vertical magnetic data storage, in which the read/write process takes place perpendicular to the surface of the disk, the read/write head may come in direct contact with the silicon substrate surface, and slide across this, without any manifestations of abrasion occurring, which would impair the reliability of the individual storage disk, and of the storage disk system in general.

We claim:

1. A disk for magnetic data storage, comprising a substrate layer of silicon having a plurality of pores in the silicon; and a magnetizable material disposed in at least some of the pores forming a data recording area.

2. The disk of claim 1 wherein the silicon is monocrystalline and the pores containing the magnetizable material predominantly have a surface diameter smaller than a maximum depth of the pore making the pores substantially perpendicular to the surface of the substrate.

3. The disk of claim 1 wherein the silicon is monocrystalline and the surface of the magnetizable material in at least some of the pores is recessed relative to the top of the pore.

4. The disk of claim 1, wherein the porous surface layer comprises silicon, silicon oxide or silicon nitride.

5. The disk of claim 1, wherein the typical diameter of the pores is less than approximately 20 nm.

6. The disk of claim 1, wherein the magnetizable material includes CoCr, CoCrTa, or CoPtCr.

7. The disk of claim 1, wherein the magnetizable material in the pores is magnetically anisotropic perpendicular to the substrate surface.

8. A method for manufacturing a disk for magnetic data storage, comprising the steps of:

removing material from a layer of silicon on a substrate surface to form a porous surface having a plurality of pores; and depositing magnetizable material into at least some of the pores.

9. The method of claim 8, further comprising the step of removing magnetic material deposited on the surface between the pores.

10. The method of claim 8, wherein the removing step includes anodic oxidation of the substrate.

11. The method of claim 10, wherein hydrofluoric acid is used in the anodic oxidation of the substrate.

12. The method of claim 8, wherein the removing step produces pores having a surface diameter smaller than a maximum depth making the pores substantially perpendicular to the surface.

13. The method of claim 8, wherein the depositing step further comprises sputtering a magnetic material into the pores or using a CVD process to deposit a magnetic material into the pores.

14. The method of claim 8, further comprising the step of polishing the surface to remove magnetizable material deposited between the pores.

15. The method of claim 8, further comprising the step of removing a portion of the magnetizable material deposited in the pores to form a recessed area in the pores.

16. The method of claim 8, further comprising the step of the adding ions or atoms to the silicon surface to form an enhancement layer.

17. The method of claim 16, further comprising the step of heat treating the enhancement layer.

18. The method of claim 8, further comprising the step of forming an enhancement layer of silicon oxide or silicon nitride.

* * * * *